United States Patent [19]

Nishiguchi et al.

[11] Patent Number: 5,879,442
[45] Date of Patent: Mar. 9, 1999

[54] AQUEOUS SLURRY OF PRECIPITATED CALCIUM CARBONATE AND GROUND CALCIUM CARBONATE IN COMBINATION

[75] Inventors: Hiroyuki Nishiguchi; Kazuhisa Shimono, both of Ome; Tetsuo Kumasaka, Hachioji, all of Japan

[73] Assignee: Okutama Kogyo Co., Ltd., Japan

[21] Appl. No.: 998,034

[22] Filed: Dec. 23, 1997

[30] Foreign Application Priority Data

Dec. 27, 1996 [JP] Japan .................................. 8-351596

[51] Int. Cl.$^6$ ....................................................... C09C 1/02
[52] U.S. Cl. ............................................ 106/464; 106/465
[58] Field of Search ..................................... 106/464, 465

[56] References Cited

U.S. PATENT DOCUMENTS

| 3,940,550 | 2/1976 | Delfosse et al. | 106/464 |
|---|---|---|---|
| 3,989,195 | 11/1976 | Falcon-Steward | 106/464 |
| 3,998,651 | 12/1976 | Baudouin et al. | 106/464 |
| 4,026,762 | 5/1977 | Bauman . | |
| 4,159,312 | 6/1979 | Shibazaki et al. | 106/464 |
| 4,898,620 | 2/1990 | Rayfield et al. | 106/464 |
| 5,120,365 | 6/1992 | Kogler | 106/464 |
| 5,489,471 | 2/1996 | Inoue et al. | 428/304.4 |
| 5,676,747 | 10/1997 | Brown | 106/464 |
| 5,743,952 | 4/1998 | Skuse et al. | 106/464 |

FOREIGN PATENT DOCUMENTS

| 0 521 737 | 1/1993 | European Pat. Off. . |
|---|---|---|
| 53-81709 | 7/1978 | Japan . |
| 54-120709 | 9/1979 | Japan . |
| 57-30555 | 2/1982 | Japan . |
| 57-184430 | 11/1982 | Japan . |
| 63-65958 | 3/1988 | Japan . |
| 63-225522 | 9/1988 | Japan . |
| 1-15640 | 3/1989 | Japan . |
| 4-33731 | 6/1992 | Japan . |
| WO93/12038 | 6/1993 | WIPO . |

OTHER PUBLICATIONS

*Chemical Abstracts*, 91(1), abstract No. 9660736 (abstract of JP 54–120709) (Sep. 1979).

*Primary Examiner*—Michael Marcheschi
*Attorney, Agent, or Firm*—Wenderoth, Lind & Ponack, L.L.P.

[57] ABSTRACT

Proposed is a method for the preparation of an aqueous slurry of calcium carbonate particles suitable as a base pigment in the preparation of a paper coating composition having excellent water retentivity and high solid concentration with good flowability, which contains precipitated and ground calcium carbonate particles in combination in a specified weight proportion and characterized by several parameters. The aqueous slurry is prepared in a process comprising the steps of: (a) subjecting an aqueous slurry or wet cake containing a specified amount of specific precipitated calcium carbonate particles to a primary dispersing treatment using a mixer to a specified extent; (b) admixing the aqueous slurry with a specified amount of specific ground calcium carbonate particles; (c) subjecting the aqueous slurry to a secondary dispersing treatment using a mixer to a specified extent; and (d) subjecting the aqueous slurry to a tertiary dispersing treatment using a sand grinder to a specified extent.

4 Claims, No Drawings

AQUEOUS SLURRY OF PRECIPITATED CALCIUM CARBONATE AND GROUND CALCIUM CARBONATE IN COMBINATION

BACKGROUND OF THE INVENTION

The present invention relates to an aqueous slurry of calcium carbonate particles and a method for the preparation thereof. More particularly, the invention relates to an aqueous slurry containing precipitated calcium carbonate particles and ground calcium carbonate particles in combination and exhibiting an outstandingly low high-shear viscosity and excellent high-speed flowability despite the relatively high solid concentration so as to be useful as a base composition for the preparation of a paper coating composition capable of giving coated paper sheets, including coated paper sheets, such as art paper, general-purpose coated paper, light-coated paper, medium-coated paper and reclaimed coated paper, thermosensitive recording paper, pressure-sensitive recording paper, ink-jet recording paper, PPC paper and thermotransfer paper, exhibiting excellent printability and printing glossiness as printed as well as a method for the preparation of such an aqueous slurry of calcium carbonate particles.

In recent years, production of coated paper products is under growing year by year and the growth of production is particularly remarkable for coated paper products of A2, A3, B2 and B3 grades as well as light weight-coated paper.

Along with the progress in paper-making machines and paper-coating machines for a higher and higher running velocity in recent years, technology innovation is now under way for blade coaters as a type of paper-coating machines. Accordingly, while the running velocity of conventional paper coating machines is around 1000 to 1500 meters/minutes, a higher running velocity exceeding 1500 meters/minute is now within view for modern paper-coating machines to be newly installed.

Needless to say, such a high running velocity of the paper coating process cannot be accomplished by the progress of the paper-coating machines only but improvements of the paper coating compositions are indispensable relative to the rheological properties such as lower viscosity or consistency and higher flowability to comply with the high-speed running of the paper-coating machine as well as to the solid concentration thereof which should be as high as possible in order to decrease the load on the drying machines while the requirements for the lower viscosity and higher solid concentration in an aqueous paper coating composition are sometimes contradictory.

In the paper coating process by using a blade coater mentioned above, the paper coating composition applied to the surface of the running base paper web is subjected to a large shearing force so that poor Theological properties of the paper coating composition results in appearance of striations in the coating layer on the coated paper sheet. Accordingly, a primary requisite for a paper coating composition used in a blade coater is that the coating composition has a low viscosity even under a high shearing force, i.e. high-shear viscosity, to exhibit good high-speed flowability even when the solid concentration thereof is relatively high.

As is known, an aqueous paper coating composition for coated paper is an aqueous slurry of an inorganic pigment, such as clay, e.g., kaolin clay, precipitated calcium carbonate, ground calcium carbonate, titanium dioxide and satin white either alone or as a combination of two kinds or more, dispersed in an aqueous medium containing a water-soluble resin as a binder of the pigment particles together with other optional additives. Since a paper coating composition containing kaolin clay alone as the pigment is sometimes inferior in respect of the high-speed flowability, for example, it is a usual practice that a slurry of kaolin is admixed with a slurry of calcium carbonate particles to prepare a paper coating composition in order to improve the high-speed flowability of the composition.

A high solid concentration of a paper coating composition is usually accomplished by increasing the content of the pigment in the pigment slurry. Pigment slurries typically employed in the preparation of a paper coating composition include a slurry of kaolin clay having a solid concentration of 60 to 75% by weight prepared by cowless dispersion, a slurry of dry-ground calcium carbonate further ground in a wet process having a solid concentration of 70 to 80% by weight and a slurry having a solid concentration of 60 to 70% by weight prepared by dispersing a dry powder or wet cake of precipitated calcium carbonate in water.

The formulation of paper coating compositions relative to the pigment is, though dependent on the grade of the coated paper product, type of the base paper web, desired coating amount and other factors, usually in the range from 50 to 95% by weight for a clay pigment and from 5 to 50% by weight for a calcium carbonate pigment. The calcium carbonate pigment is selected depending on the intended application field and grade of the coated paper product from ground calcium carbonate, precipitated calcium carbonate and mixtures of these two types of calcium carbonate powders in an appropriate mixing proportion.

Clay pigments are graded into several classes including class 1, class 2, delamination class and the like depending on various factors such as place of occurrence as a natural mineral and the like. It is usual that a paper coating composition is prepared by using the class 1 and class 2 clay pigments in combination.

Ground calcium carbonate pigments are graded into #95, #90, #75 and #60 for wet-process slurries and into #2200, #2000, #1500, #800 and #100 for dry-ground powders. It is usual that a paper coating composition for under-coating is prepared using a coarse-grade calcium carbonate pigment and top-coating composition is prepared using a fine-grade pigment. In particular, paper coating compositions used in high-speed coating machines are usually prepared from a slurry of 70 to 80% solid concentration of wet-ground calcium carbonate of the #95 and #90 grades for top coating and wet-ground calcium carbonate of #75 and #60 grades for under-coating.

Precipitated calcium carbonate pigments are sold on the market in the form of an aqueous slurry and dry powder having different particle sizes in which the particles have a scalenohedral, i.e. rosette-shaped or spindle-formed, rhombohedral, prismatic or acicular configuration. Aqueous slurries of 60 to 70% solid concentration having somewhat improved high-speed flowability characteristics are usually employed in a paper coating composition for the preparation of coated paper of the A2, A3, B2 and B3 grades and light weight-coated paper as coated printing paper.

When the whiteness of the base paper is relatively low, when intended coating amount is small, when a high glossiness is desired or when good printability of the coated paper is essential, it is a preferable way to use a precipitated calcium carbonate pigment alone, in many cases, in combination with a ground calcium carbonate pigment because precipitated calcium carbonate pigments well meet these requirements.

An aqueous slurry of a precipitated calcium carbonate pigment, however, has a problem, as compared with ground calcium carbonate pigments, that the slurry of the former pigment is inferior in the high-speed flowability behavior when the solid concentration is identical so that a paper coating composition prepared from a precipitated calcium carbonate pigment can hardly be used in high-speed coating machines.

In view of the above described problem, a proposal has been made in Japanese Patent Kokai 57-184430, in order to obtain an aqueous slurry of high solid concentration from a precipitated calcium carbonate pigment, for a method in which an aqueous slurry of 60 to 80% by weight solid concentration is prepared by using a combination of two powders of precipitated calcium carbonate having different particle diameters with admixture of an inorganic electrolyte such as calcium hydroxide. In this method, for example, a viscosity-reducing agent and calcium hydroxide are added and dispersed in an aqueous slurry of a precipitated calcium carbonate pigment followed by additional admixture of a powder of precipitated calcium carbonate and calcium hydroxide to make up a slurry of 70 to 72% solid concentration. The aqueous slurry prepared by this method is naturally expensive because of the use of a dry calcium carbonate powder as an adjuvant and the high-shear viscosity is as high as 230 to 490 centipoise due to the mixing process by using a stirrer.

A method is proposed in Japanese Patent Kokai 54-120709, according to which a calcium carbonate slurry suitable for paper quality improvement is prepared by introducing a powder of ground calcium carbonate and slurry of precipitated calcium carbonate into a high-speed mixer and intensively mixing the blend. The slurry obtained by this method, however, has a disadvantage in respect of the low paper quality such as white paper glossiness and a slurry of a high solid concentration of 75% by weight or higher can hardly be obtained as compared with slurries of wet-ground calcium carbonate currently under practical use in many paper manufacturers.

With an object to improve the high-speed flowability of an aqueous slurry of ground calcium carbonate and to upgrade the quality of the coated paper such as white-paper glossiness to be comparable with that by using a slurry of precipitated calcium carbonate, a proposal has been made in Japanese Patent Publications 55-11799, 1-15640, 4-33731 and 6-45010 and Japanese Patent Kokai 57-30555 and 63-225522 according to which a dry-ground calcium carbonate powder is subjected to wet-grinding in a sand grinder. This method has been developed so far as to furnish an aqueous slurry of wet-ground calcium carbonate having a solid concentration of 70 to 75% by increasing the degree of grinding to accomplish a finer average particle diameter with a decreased amount of coarser particles resulting in an improvement in the white-paper glossiness of coated paper products.

When comparison is made for a slurry of wet-ground calcium carbonate of #90 or #95 grade with that of precipitated calcium carbonate relative to the quality of coated paper, however, the coated paper is generally inferior in the whiteness, white-paper glossiness and printability such as ink receptivity and ink setting though equivalent printing glossiness can be obtained. As a consequence of the fine grinding, in addition, the BET specific surface area of the powder is increased so much necessitating an increase in the amount of the dispersing agent with an increase in the high-shear viscosity and decrease in the high-speed flowability as well as a decrease in the surface strength of the coated paper which requires an increase in the amount of the binder in the preparation of paper coating compositions.

SUMMARY OF THE INVENTION

The present invention accordingly has an object to provide, with an object to solve the problems in the conventional aqueous slurries of precipitated calcium carbonate, ground calcium carbonate or a combination of both used in the preparation of paper coating compositions, an aqueous slurry of mixed calcium carbonate having a low high-shear viscosity and exhibiting excellent high-speed flowability even with a relatively high solid concentration and a method for the preparation thereof as well as a paper coating composition capable of giving coated paper products having excellent optical properties and printability.

Thus, the aqueous slurry of calcium carbonate provided by the present invention is an aqueous slurry containing from 70 to 85% by weight of a combination of particles of precipitated calcium carbonate and particles of ground calcium carbonate in a weight proportion in the range from 20:80 to 80:20, of which the median diameter of the particles is in the range from 0.2 to 2.0 $\mu$m and the BET specific surface area is in the range from 5 to 25 m$^2$/g, and having a viscosity not exceeding 1000 centipoise at 25 ° C. and a high-shear viscosity not exceeding 200 centipoise at 25 ° C.

The above defined aqueous slurry of calcium carbonate particles is obtained by a method which comprises the steps of:

(a) subjecting an aqueous slurry or a dehydrated wet cake of precipitated calcium carbonate with admixture of a viscosity-reducing agent having a solid concentration in the range from 25 to 75% by weight to a primary dispersing treatment by using a mixer to such an extent that the calcium carbonate particles have a median diameter in the range from 0.2 to 3.0 $\mu$m and the slurry has a viscosity not exceeding 1000 centipoise;

(b) admixing the slurry with particles of dry-ground calcium carbonate having a median diameter in the range from 1.5 to 30.0 $\mu$m in such an amount that the weight proportion of the precipitated calcium carbonate to the ground calcium carbonate is in the range from 20:80 to 80:20 and the solid concentration of the slurry is in the range from 60 to 85% by weight;

(c) subjecting the slurry to a secondary dispersing treatment by using a mixer to such an extent that the slurry has a viscosity not exceeding 1000 centipoise at 25° C.; and (d) subjecting the slurry to a tertiary dispersing treatment in a sand grinder to such an extent that the median diameter of the calcium carbonate particles is in the range from 0.2 to 2.0 $\mu$m.

DETAILED DESCRIPTION OF THE PREFERRED EMBODIMENTS

As is described above, the aqueous slurry of calcium carbonate is characterized by the specific combination of precipitated and ground calcium carbonate particles having specified median diameter and BET specific surface area in a specified solid concentration and by the specific viscosity and high-shear viscosity. Incidentally, the median diameter of particles is determined by using a laser granulometric testing instrument and the viscosity of the slurry is determined by using a Brookfield viscometer at 25° C.

Namely, the inventive aqueous slurry of calcium carbonate particles contains from 70 to 85% by weight or, preferably, from 70 to 80% by weight of a combination of precipitated calcium carbonate particles and ground calcium carbonate particles in a weight proportion in the range 20:80 to 80:20 or, preferably, from 51:49 to 70:30, the combination of calcium carbonate particles having a median diameter in the range from 0.2 to 2.0 $\mu$m or, preferably, from 0.3 to 1.5 $\mu$m and a BET specific surface area in the range from 5 to 25 m$^2$/g or, preferably, from 7.5 to 20 m$^2$/g, and having a viscosity at 25° C. not exceeding 1000 centipoise or, preferably, not exceeding 500 centipoise and a high-shear viscosity at 25° C. not exceeding 200 centipoise or, preferably, not exceeding 100 centipoise. As to the particle size distribution of the calcium carbonate particles, the frequency of the particles of 7.5 $\mu$m or larger or, preferably, 5.3 $\mu$m or larger by the laser granulometry should be zero. The inventive calcium carbonate slurry exhibits a wire abrasion not exceeding 70 mg or, in particular, not exceeding 60 mg.

The above described aqueous slurry of calcium carbonate can be prepared by a process which comprises the steps of:
(a) subjecting an aqueous slurry or a dehydrated wet cake of precipitated calcium carbonate particles with admixture of a viscosity-reducing agent having a solid concentration in the range from 25 to 75% by weight to a primary dispersing treatment by using a mixer to such an extent that the calcium carbonate particles have a median diameter in the range from 0.2 to 3.0 $\mu$m and the slurry has a viscosity not exceeding 1000 centipoise;
(b) admixing the slurry with dry-ground calcium carbonate particles having a median diameter in the range from 1.5 to 30.0 $\mu$m in such an amount that the weight proportion of the precipitated calcium carbonate to the ground calcium carbonate is in the range from 20:80 to 80:20 and the solid concentration of the slurry is in the range from 60 to 85% by weight;
(c) subjecting the slurry to a secondary dispersing treatment by using a mixer to such an extent that the slurry has a viscosity not exceeding 1000 centipoise at 25° C. ; and
(d) subjecting the slurry to a tertiary dispersing treatment in a sand grinder to such an extent that the median diameter of the calcium carbonate particles is in the range from 0.2 to 2.0 $\mu$m.

By virtue of the specific dispersing treatments, the aqueous slurry of calcium carbonate containing precipitated and ground calcium carbonate particles in combination in a specified proportion is free from coarse particles of ground calcium carbonate to such an extent that the frequency of particle size distribution determined by the laser granulometric measurement is substantially zero for particles of 7.5 $\mu$m or coarser or, in particular, 5.3 $\mu$m or coarser.

The aqueous slurry or dehydrated wet cake of precipitated calcium carbonate particles containing from 25 to 75% by weight of solid matter used as the starting material in the inventive method includes the reaction slurry obtained by introducing a carbon dioxide-containing gas into a lime milk and a thickened slurry or dehydrated cake obtained by subjecting the above mentioned reaction slurry to concentration, by dehydration or by squeezing under pressure according to a conventional method as well as semi-dry calcium carbonate powder obtained by dehydration or drying and a slurry obtained by re-slurrying the dehydrated cake or semi-dry powder in water.

The particle configuration of the precipitated calcium carbonate particles is not particularly limitative including spindle-formed, polyhedral, columnar and agglomerated particles, of which spindle-formed particles are preferred. The dehydration treatment of an aqueous slurry of precipitated calcium carbonate can be performed by a conventional method using various types of dehydrating machines including pressurizing dehydrating machines such as filter press and belt press, vacuum-drum dehydrating machines such as Oliver filter and centrifugal dehydrating machines such as decanters. The pressure-squeezing treatment is performed by using a machine suitable for concurrent dehydration and granulation such as belt press and granulating rollers.

In the first step of the inventive method, the above mentioned aqueous slurry or dehydrated wet cake with admixture of a viscosity-reducing agent is subjected to a primary dispersing treatment by using a mixer.

The above mentioned viscosity-reducing agent can be any of conventional viscosity-reducing agents used in the preparation of an aqueous dispersion of a pigment in the prior art. Examples of suitable viscosity-reducing agents include polycarboxylic acid such as a homopolymer or copolymer of maleic acid, itaconic acid, acrylic acid and the like or salts thereof. The amount of the viscosity-reducing agent added to the slurry or dehydrated cake is in the range from 0.1 to 3.0% by weight or, preferably, from 0.3 to 1.5% by weight based on the amount of the calcium carbonate.

The primary dispersing treatment is a mixing treatment undertaken by using a mixer such as cowless mixers and agitating dispersers. The primary dispersing treatment is performed to such an extent that the calcium carbonate particles have a median diameter in the range from 0.2 to 3.0 $\mu$m by the laser granulometric measurement and the aqueous slurry has a viscosity not exceeding 1000 centipoise at 25° C.

In the next step, the aqueous slurry of precipitated calcium carbonate particles obtained by the primary dispersing treatment is admixed with particles of dry-ground calcium carbonate having a median diameter in the range from 1.5 to 30.0 $\mu$m or, preferably, in the range from 1.5 to 20 $\mu$m. The dry-ground calcium carbonate can be a conventional dry-ground calcium carbonate for paper making use or that used as a starting material in the preparation of a wet-ground calcium carbonate for paper making use. The amount of the particles of ground calcium carbonate is such that the resultant aqueous slurry contains from 60 to 85% by weight of the calcium carbonate particles as a total and the weight proportion of the precipitated calcium carbonate particles to the ground calcium carbonate particles is in the range from 20:80 to 80:20 or, preferably, from 30:70 to 70:30 or, more preferably, from 51:49 to 70:30.

The aqueous slurry admixed with particles of ground calcium carbonate is then subjected to a secondary dispersing treatment, preferably, with admixture of a viscosity-reducing agent by using a mixer such as cowless mixers and agitating dispersers. The secondary dispersing treatment is performed to such an extent that the aqueous slurry has a viscosity not exceeding 1000 centipoise and the calcium carbonate particles contained therein have a BET specific surface area in the range from 3 to 15 $m^2$/g or, preferably, from 4 to 14 $m^2$/g.

The above described primary and secondary dispersing treatments are performed preferably in the same vessel as successive steps.

The aqueous slurry of calcium carbonate particles obtained by the secondary dispersing treatment is subjected to a tertiary dispersing treatment which is a sand grinding treatment performed by passing the aqueous slurry through a sand grinding mill such as sand mills, sand grinders, attriters, Daino mills, pin mills and the like. The beads as the grinding medium can be glass beads or ceramic beads having a diameter in the range from 0.5 to 5 mm or, preferably, from 0.7 to 2 mm. It is preferable that 2 to 4 runs of this sand grinding treatment are repeated to complete the tertiary dispersing treatment. This is because, when the sand grinding machine is operated under a reduced discharge rate instead, an increase is sometimes caused in the viscosity of the slurry under treatment. It is also preferable that the aqueous slurry under the tertiary dispersing treatment is admixed with a viscosity-reducing agent. The tertiary dispersing treatment is undertaken to such an extent that the calcium carbonate particles contained in the slurry have a BET specific surface area in the range from 5 to 25 $m^2$/g or, preferably, from 7.5 to 20 $m^2$/g.

The aqueous slurry of calcium carbonate according to the present invention can be used as such as a pigment composition for paper making although it is optional that the inventive aqueous slurry is admixed with various kinds of additives conventionally used in pigment compositions for paper making. For example, the inventive aqueous slurry of calcium carbonate can be admixed with one or more kinds of other pigments such as clay, kaolin, talc, titanium dioxide and satin white to give a combined pigment composition for paper making. The amount of addition of these additional pigments is in the range, usually, from 5 to 95% by weight or, in most cases, from 10 to 90% by weight based on the total amount of the slurry after admixture thereof.

In the following, the present invention is described in more detail by way of Examples and Comparative Examples, which, however, never limit the scope of the invention in any way. In the following examples, the term of "parts" always refers to "parts by weight". Evaluation of the calcium carbonate slurry prepared in the examples was performed for the following properties by the respective testing procedures described there.

(1) Median diameter of calcium carbonate particles

The median diameter of particles, which is an average particle diameter of the particles, was determined by using a laser granulometric tester (Model Microtrac SPA II, manufactured Nikkiso Co.).

(2) SEM particle diameter

A scanning electron microscopic photograph was taken for 50 to 100 particles of calcium carbonate and the longer and shorter axes of the particles were determined on the photograph by using a Desimatic Caliper to calculate the average of the values as obtained.

(3) Viscosity of slurry

Measurements were made at 25° C. by using a Brookfield viscometer with a rotor rotating at 60 rpm.

(4) High-shear viscosity

Measurements were performed by using a high-shear viscometer (Model Hercules HR-801C, manufactured by Kumagai Riki Kogyo Co.) with a F-bob rotating at 4400 rpm for an aqueous slurry of calcium carbonate and rotating at 8800 rpm for a paper coating composition.

(5) BET specific surface area

A small portion of the aqueous slurry was dried by heating at 105° C. for 24 hours to give a dried mass which was disintegrated in a coffee mill to give a powder which was subjected to the measurement of the specific surface area by using an instrument (Model Flow Sorb II 2300, manufactured by Shimadzu Seisakusho Co.).

(6) Wire abrasion

Amount of abrasive wear of a plastic filament was measured by using an abrasion tester (manufactured by Nippon Filcon Co.) for a testing time of 3 hours with a diluted slurry of 2% by weight solid concentration.

(7) Solid concentration of slurry

Measurement was made by using an infrared moisture tester (Model Mettler LP-10, manufactured by Mettler Co.).

(8) Smoothness of coated paper, Smooster

Measurements were made according to Japan TAPPI No. 5.

(9) Smootheness of coated paper, Bekk

Measurements were made according to JIS P 8119.

(10) Air permeability

Measurements were made according to JIS P 8117.

(11) Whiteness of coated paper

Measurement was made according to JIS P 8123.

(12) Opacity

Measurement was made according to JIS P 8136.

(13) White paper glossiness of coated paper

Measurement was made according to the procedure specified in JIS P 8142.

(14) Printing glossiness on coated paper

Measurement was made according to the procedure specified in JIS P 8142 by using 0.4 ml of a printing ink TKUG-ro.

(15) Ink setting

Transfer of printing ink from a printed paper sheet was evaluated by using a Hunter whiteness tester.

(16) K & N Ink receptivity

Measurement was made according to the procedure specified in Japan TAPPI No. 46.

(17) RI strength, dry pick

Printing was performed 50 times by using a RI-2 printability tester and the condition of the paper surface was visually examined to record the results of paper surface picking in five ratings of 5 to 1, the rating 5 being the best.

(18) RI strength, wet pick

Printing was performed on the coated paper wet with water and the condition of the paper surface was visually examined to record the results of paper surface picking in five ratings of 5 to 1, the rating 5 being the best. Comparative Example 1.

An aqueous slurry containing 8% by weight of precipitated calcium carbonate particles of scalenohedral particle configuration having a median diameter of 2.5 $\mu$m and SEM particle diameters of 0.8 $\mu$m and 0.2 $\mu$m for the longer and shorter axes, respectively, was dehydrated by using a screw decanter into an aqueous slurry of 40% by weight solid concentration which was further dehydrated by using a belt press to give a dehydrated cake having a solid concentration of 65% by weight. This dehydrated cake was admixed with a sodium polyacrylate-based viscosity-reducing agent (Alon T-40, a product by Toa Gosei Co.) in an amount of 1.0% by weight on the solid basis and agitated for 5 minutes by using a cowless mixer at a peripheral velocity of 25 m/second to give an aqueous slurry of the precipitated calcium carbonate. Table 1 below shows the solid concentration, pH, Brookfield viscosity, high-shear viscosity, median particle diameter, BET specific surface area and wire abrasion of this aqueous slurry.

A paper coating composition was prepared by admixing 100 parts of the above prepared aqueous slurry with 3 parts of starch (Nisshoku #4600), 12 parts of an SBR latex of 50% solid concentration (JSR 0692, a product by Japan Synthetic Rubber Co.) and 1.5 parts of calcium stearate (Nopcoat C104) as a lubricant followed by further addition of water and ammonia water to make up a solid concentration of 55% by weight and to effect adjustment of the pH value. Table 2 below shows the solid concentration, pH, viscosity and high-shear viscosity of this paper coating composition.

Woodfree paper having a basis weight of 54 gm$^2$ as a base paper web was coated with this paper coating composition by manual working using a coating rod followed by drying at 105 ° C. for 2 minutes and a super-calendering treatment under the conditions of: 100 kg cm of linear pressure, 105 ° C. of temperature, 8 m minute of treatment velocity and 2 times of nipping, to give a coated paper sample. Table 3 below shows the results of the evaluation tests undertaken for this coated paper sample. Comparative Example 2.

An aqueous slurry of precipitated calcium carbonate obtained in the same formulation and in the same manner as in Comparative Example 1 was admixed with dry-ground calcium carbonate particles having a median diameter of 5.8 $\mu$m (Escalon #100, a product by Sankyo Seifun Co.) in an amount to give a weight ratio of the precipitated calcium carbonate to ground calcium carbonate of 55:45 under agitation in a cowless mixer at a peripheral velocity of 25 m second as preceded by the addition of a dispersing agent (Alon T-40, supra) in an amount of 0.3% by weight based on the amount of the ground calcium carbonate and followed by further continued agitation for 10 minutes to give an aqueous slurry of precipitated and ground calcium carbonate powders in combination. The results of testing of this aqueous slurry are shown in Table 1.

A paper coating composition was prepared by using this aqueous calcium carbonate slurry in the same manner as in Comparative Example 1 of which the results of testing are shown in Table 2. Further, this paper coating composition was used in the preparation of coated paper samples in the same manner as in Comparative Example 1 and the results of the evaluation tests of the coated paper samples are shown in Table 3.

EXAMPLE 1.

The experimental procedure was substantially the same as in Comparative Example 2 except that the aqueous slurry of precipitated and ground calcium carbonate powders in combination prepared in the same manner as in Comparative Example 2 was further subjected once to a tertiary dispersing treatment by using a sand grinder (Model SLG 1/2, manufactured by Aimex Co.) 80% filled with glass beads of 1.5 mm diameter at a discharge rate of 0.4 liter/minute and a peripheral velocity of 8 m/second to give an aqueous calcium carbonate slurry of the invention.

The results of the evaluation tests for the aqueous calcium carbonate slurry, the paper coating composition prepared by using the slurry and the coated paper samples are shown in Tables 1 to 3.

EXAMPLE 2.

The experimental procedure was substantially the same as in Example 1 except that the sand grinding treatment of the aqueous slurry was repeated twice instead of once under the same operating conditions.

The results of the evaluation tests for the aqueous calcium carbonate slurry, the paper coating composition prepared by using the slurry and the coated paper samples are shown in Tables 1 to 3.

EXAMPLE 3.

The experimental procedure was substantially the same as in Example 1 except that the sand grinding treatment of the aqueous slurry was repeated three times instead of once under the same operating conditions.

The results of the evaluation tests for the aqueous calcium carbonate slurry, the paper coating composition prepared by using the slurry and the coated paper samples are shown in Tables 1 to 3.

COMPARATIVE EXAMPLE 3.

The experimental procedure was substantially the same as in Comparative Example 1 except that the aqueous slurry of precipitated calcium carbonate obtained in the same manner as in Comparative Example 1 was subjected once to the same sand grinding treatment as in Example 1.

The results of the evaluation tests for the aqueous calcium carbonate slurry, the paper coating composition prepared by using the slurry and the coated paper samples are shown in Tables 1 to 3.

COMPARATIVE EXAMPLE 4.

The experimental procedure was substantially the same as in Comparative Example 1 except that the aqueous calcium carbonate slurry was prepared by blending the same ground calcium carbonate as used in Comparative Example 2 (Escalon #100, supra), water and the dispersing agent (Alon T-40, supra) in an amount of 0.3% by weight based on the calcium carbonate in a cowless mixer for 5 minutes.

The results of the evaluation tests for the aqueous calcium carbonate slurry, the paper coating composition prepared by using the slurry and the coated paper samples are shown in Tables 1 to 3.

COMPARATIVE EXAMPLE 5.

The experimental procedure was substantially the same as in Comparative Example 4 except that the aqueous slurry of ground calcium carbonate obtained in the same manner as in Comparative Example 4 was subjected once to the same sand grinding treatment as in Example 1.

The results of the evaluation tests for the aqueous calcium carbonate slurry, the paper coating composition prepared by using the slurry and the coated paper samples are shown in Tables 1 to 3.

COMPARATIVE EXAMPLE 6.

The experimental procedure was substantially the same as in Comparative Example 5 except that the aqueous slurry of ground calcium carbonate obtained in the same manner as in Comparative Example 4 was subjected twice instead of once to the same sand grinding treatment as in Example 1.

The results of the evaluation tests for the aqueous calcium carbonate slurry, the paper coating composition prepared by using the slurry and the coated paper samples are shown in Tables 1 to 3.

COMPARATIVE EXAMPLE 7.

The experimental procedure was substantially the same as in Comparative Example 5 except that the aqueous slurry of ground calcium carbonate obtained in the same manner as in Comparative Example 4 was subjected three times instead of once to the same sand grinding treatment as in Example 1 and the discharge rate in the sand grinder was 0.2 liter/minute instead of 0.4 liter/minute.

The results of the evaluation tests for the aqueous calcium carbonate slurry, the paper coating composition prepared by using the slurry and the coated paper samples are shown in Tables 1 to 3.

COMPARATIVE EXAMPLE 8.

An attempt was made to prepare an aqueous slurry of precipitated and ground calcium carbonates having a solid concentration of 76% by weight by mixing, in a cowless mixer at a peripheral velocity of 25 m/second, an aqueous slurry of precipitated calcium carbonate particles of 65% by weight solid concentration obtained in the same manner as in Comparative Example 1 with water, dry-ground calcium carbonate particles (Escalon #100, supra) in an amount to give a weight ratio of the precipitated calcium carbonate to ground calcium carbonate of 55:45 and the dispersing agent (Alon T-40, supra) in a total amount corresponding to 1% by weight of the precipitated calcium carbonate and 0.3% of the ground calcium carbonate. The result was that the mixture was in the form of a gelled mass and not in the form of an aqueous slurry.

COMPARATIVE EXAMPLE 9.

The experimental procedure was substantially the same as in the preceding examples except that the aqueous calcium carbonate slurry contained precipitated and ground calcium carbonates in combination as prepared by blending the aqueous slurry of precipitated calcium carbonate particles obtained in the same manner as in Comparative Example 3 and the aqueous slurry of ground calcium carbonate particles obtained in the same manner as in Comparative Example 7 in such a proportion that the weight ratio of precipitated calcium carbonate to ground calcium carbonate was 55:45 and subjecting the mixture to a dispersing treatment in a cowless mixer at a peripheral velocity of 25 m/second.

The results of the evaluation tests for the aqueous calcium carbonate slurry, the paper coating composition prepared by using the slurry and the coated paper samples are shown in Tables 1 to 3.

Comparison of the above described Comparative Examples and Examples leads to the following conclusions.

Namely, an aqueous slurry of precipitated calcium carbonate alone cannot be prepared in a sufficiently high solid concentration and this difficulty cannot be overcome by merely blending aqueous slurries of precipitated and ground calcium carbonates. An aqueous slurry of ground calcium carbonate alone, even after repeated dispersing treatments, cannot give a paper coating composition from which coated paper of high whiteness, high white-paper glossiness and high printing glossiness can be obtained. Further, even an aqueous slurry of precipitated and ground calcium carbonates in combination exhibits greatly increased wire abrasion when the sand grinding treatment as the tertiary dispersing treatment is not undertaken. In contrast thereto, the solid concentration in the aqueous slurries according to the present invention can be as high as in an aqueous slurry of ground calcium carbonate alone and still the aqueous slurry, besides a decrease in the wire abrasion, gives a paper coating composition by use of which coated paper having white-paper glossiness as high as in coated paper obtained from an aqueous slurry of precipitated calcium carbonate alone as well as particularly increased printing glossiness can be obtained.

TABLE 1

|  |  | Solid concentration, % by weight | pH | Viscosity, cP | High-shear viscosity, cP | Median particle diameter, μm | BET specific surface area, m²/g | Wire abrasion, mg |
|---|---|---|---|---|---|---|---|---|
| Comparative Example | 1 | 64.1 | 10.2 | 25 | 200< | 1.1 | 9.3 | 25 |
|  | 2 | 76.5 | 10 | 340 | 200< | 1.5 | 7.1 | *) |
| Example | 1 | 76 | 10 | 45 | 80 | 1.13 | 8.9 | 45 |
|  | 2 | 75.8 | 10.1 | 61 | 69 | 1.05 | 9.5 | 35 |
|  | 3 | 75.8 | 10.1 | 75 | 45 | 0.92 | 10 | 28 |

TABLE 1-continued

|  |  | Solid concentration, % by weight | pH | Viscosity, cP | High-shear viscosity, cP | Median particle diameter, μm | BET specific surface area, m²/g | Wire abrasion, mg |
|---|---|---|---|---|---|---|---|---|
| Comparative Example | 3 | 63.8 | 10.4 | 31 | 20 | 0.85 | 11.1 | 20 |
|  | 4 | 75.6 | 10 | 45 | 63 | 2.2 | 5.5 | *) |
|  | 5 | 75.5 | 10 | 70 | 89 | 1.85 | 7.3 | *) |
|  | 6 | 75.3 | 10.1 | 105 | 80 | 1.4 | 9.8 | *) |
|  | 7 | 75.4 | 9.9 | 194 | 89 | 1.18 | 11 | 80 |
|  | 9 | 69.2 | 10.2 | 125 | 45 | 1.05 | 11 | 60 |

*): plastic filament broken

TABLE 2

|  |  | Solid concentration, % by weight | pH | Viscosity, cP | High-shear viscosity, cP |
|---|---|---|---|---|---|
| Comparative Example | 1 | 55.0 | 9.5 | 61 | 7 |
|  | 2 | 55.1 | 9.5 | 41 | 6 |
| Example | 1 | 54.9 | 9.4 | 35 | 4 |
|  | 2 | 55.0 | 9.5 | 34 | 4 |
|  | 3 | 55.0 | 9.5 | 34 | 4 |
| Comparative Example | 3 | 55.1 | 9.5 | 50 | 5 |
|  | 4 | 55.0 | 9.4 | 32 | 4 |
|  | 5 | 55.1 | 9.5 | 35 | 4 |
|  | 6 | 55.1 | 9.5 | 40 | 4 |
|  | 7 | 55.0 | 9.5 | 42 | 4 |
|  | 9 | 54.9 | 9.5 | 45 | 5 |

TABLE 3

|  | Coating amount, g/m² | Smoothness Smooster, mmHg | Smoothness Bekk, second | Air permeability, mmHg | Whiteness, % | Opacity, % | White paper glossiness, % | Printing glossiness, % | Ink setting 1 minute, % | Ink setting 2 minutes, % | Ink setting 3 minutes, % | K & N Ink receptivity, % | RI strength dry pick | RI strength wet pick |
|---|---|---|---|---|---|---|---|---|---|---|---|---|---|---|
| Comparative Example |  |  |  |  |  |  |  |  |  |  |  |  |  |  |
| 1 | 20 | 17 | 1600 | 19 | 88.6 | 93.0 | 57.5 | 82.0 | 49.0 | 56.9 | 67.0 | 18.1 | 4 | 3 |
| 2 | 20.7 | 16 | 1850 | 14 | 85.6 | 91.7 | 48.6 | 82.3 | 32.5 | 37.9 | 43.8 | 7.9 | 5 | 4 |
| Example |  |  |  |  |  |  |  |  |  |  |  |  |  |  |
| 1 | 20.3 | 15 | 1720 | 14 | 87.3 | 92.4 | 61.2 | 85.5 | 37.6 | 44.2 | 52.3 | 9.4 | 5 | 4 |
| 2 | 20.2 | 14 | 1670 | 22 | 86.3 | 92.6 | 63.5 | 85.8 | 39.9 | 47.7 | 55.3 | 6.6 | 5 | 4 |
| 3 | 20.4 | 16 | 1690 | 25 | 86.4 | 92.4 | 65.5 | 87.2 | 45.7 | 52.6 | 60.7 | 6.8 | 5 | 4 |
| Comparative Example |  |  |  |  |  |  |  |  |  |  |  |  |  |  |
| 3 | 19.9 | 18 | 1690 | 23 | 88.8 | 93.7 | 66.1 | 84.3 | 54.0 | 62.9 | 70.5 | 17.4 | 3 | 2 |
| 4 | 20.8 | 47 | 1240 | 14 | 82.8 | 90.2 | 30.7 | 54.5 | 33.8 | 36.0 | 44.1 | 9.4 | 5 | 3 |
| 5 | 20.9 | 22 | 1680 | 13 | 85.2 | 91.7 | 42.0 | 77.6 | 27.1 | 30.9 | 39.0 | 8.5 | 5 | 4 |
| 6 | 20 | 21 | 1650 | 18 | 85.4 | 91.8 | 46.0 | 79.0 | 28.0 | 32.1 | 39.0 | 9.0 | 5 | 3 |
| 7 | 20.3 | 22 | 1610 | 20 | 86.0 | 92.1 | 51.8 | 84.0 | 32.6 | 39.3 | 47.9 | 8.5 | 5 | 3 |
| 9 | 20.1 | 20 | 1680 | 22 | 87.3 | 92.8 | 59.9 | 84.2 | 37.0 | 45.2 | 56.1 | 12.9 | 4 | 3 |

EXAMPLES 4 TO 6 AND COMPARATIVE EXAMPLES 10 TO 14.

A first aqueous slurry of kaolin of 75% solid concentration was prepared by subjecting a blend of a Class 1 kaolin (UW-90), water and a dispersing agent (Alon T-40, supra) to a dispersing treatment in a cowless mixer for 20 minutes at a peripheral velocity of 25 m/second. A second aqueous slurry of kaolin of 75% by weight solid concentration was prepared in the same manner as above excepting for the use of a Class 2 kaolin (HT grade) in place of the Class 1 kaolin.

A paper coating composition was prepared in each of Examples 4 to 6 and Comparative Examples 10 to 14 in the same formulation as in Comparative Example 1 excepting for replacement of 100 parts of the aqueous slurry of calcium carbonate used in each of Examples 1 to 3 and Comparative Examples 3, 5, 6, 7 and 9, respectively, with a mixture of 60 parts of the same calcium carbonate slurry with each 30 parts of the above prepared first and second kaolin slurries and the solid concentration of the paper coating composition was 64% by weight instead of 55% by weight.

The results of the evaluation tests undertaken for the paper coating composition and coated paper in each of these examples and comparative examples are summarized in Tables 4 and 5, respectively.

REFERENCE EXAMPLE 1.

The experimental procedure was substantially the same as in Example 4 except that the paper coating composition was prepared by replacing the aqueous slurry of calcium carbonate in Example 4 with a commercially available aqueous slurry of wet-ground calcium carbonate (Carbital 90, a product by ECC Co.).

The results of the evaluation tests for the paper coating composition prepared by using the slurry and the coated paper samples are shown in Tables 4 and 5.

REFERENCE EXAMPLE 2.

The experimental procedure was substantially the same as in Example 4 except that the paper coating composition was prepared by replacing the aqueous slurry of calcium carbonate in Example 4 with a combination of the commercially available aqueous slurry of wet-ground calcium carbonate (Carbital 90, supra) and a commercially available aqueous slurry of precipitated calcium carbonate (TP-221GS, a product by Okutama Kogyo Co.) in equal amounts.

The results of the evaluation tests for the paper coating composition prepared by using the slurry and the coated paper samples are shown in Tables 4 and 5.

TABLE 4

|  |  | Solid concentration, % by weight | pH | Viscosity, cP | High-shear viscosity, cP |
|---|---|---|---|---|---|
| Example | 4 | 64.0 | 9.5 | 870 | 17 |
|  | 5 | 64.1 | 9.5 | 880 | 17 |
|  | 6 | 64.1 | 9.6 | 910 | 17 |
| Comparative Example | 10 | 64.0 | 9.4 | 930 | 21 |
|  | 11 | 63.9 | 9.5 | 780 | 18 |
|  | 12 | 64.0 | 9.5 | 810 | 17 |
|  | 13 | 64.1 | 9.4 | 840 | 17 |
|  | 14 | 64.2 | 9.5 | 880 | 20 |
| Reference Example | 1 | 63.9 | 9.5 | 850 | 17 |
|  | 2 | 64.0 | 9.5 | 870 | 20 |

TABLE 5

|  | Coating amount, g/m² | Smoothness Smooster, mmHg | Smoothness Bekk, second | Air permeability, mmHg | Whiteness, % | Opacity, % | White paper glossiness, % | Printing glossiness, % | Ink setting 1 minute, % | Ink setting 2 minutes, % | Ink setting 3 minutes, % | K & N Ink receptivity, % | RI strength dry pick | RI strength wet pick |
|---|---|---|---|---|---|---|---|---|---|---|---|---|---|---|
| Example |  |  |  |  |  |  |  |  |  |  |  |  |  |  |
| 4 | 10.3 | 33 | 1430 | 31 | 82.7 | 84.3 | 69.4 | 77.9 | 61.0 | 70.1 | 73.2 | 12.3 | 5 | 4 |
| 5 | 10.2 | 32 | 1470 | 31 | 82.6 | 84.2 | 70.1 | 78.5 | 62.1 | 71.1 | 73.8 | 12.8 | 5 | 4 |
| 6 | 10.3 | 30 | 1510 | 30 | 82.5 | 84.2 | 71.1 | 79.9 | 62.8 | 71.2 | 74.5 | 12.9 | 5 | 4 |
| Comparative Example |  |  |  |  |  |  |  |  |  |  |  |  |  |  |
| 10 | 10.4 | 30 | 1540 | 34 | 82.9 | 84.4 | 70.8 | 76.5 | 63.7 | 71.2 | 75.4 | 13.1 | 4 | 4 |
| 11 | 10.2 | 38 | 1300 | 38 | 81.5 | 83.1 | 61.2 | 74.1 | 55.1 | 66.7 | 71.1 | 11.0 | 5 | 4 |
| 12 | 10.3 | 37 | 1310 | 36 | 81.6 | 83.3 | 63.7 | 74.7 | 56.7 | 67.3 | 71.8 | 11.2 | 5 | 4 |
| 13 | 10.4 | 37 | 1380 | 35 | 82.0 | 83.6 | 65.9 | 76.3 | 58.1 | 68.2 | 72.0 | 11.3 | 5 | 4 |
| 14 | 10.1 | 35 | 1410 | 32 | 82.5 | 83.9 | 67.3 | 76.5 | 61.1 | 70.2 | 72.3 | 12.0 | 4 | 4 |
| Reference Example |  |  |  |  |  |  |  |  |  |  |  |  |  |  |
| 1 | 10.2 | 34 | 1430 | 30 | 82.4 | 83.8 | 65.5 | 76.9 | 60.7 | 69.2 | 73.5 | 11.2 | 4 | 4 |
| 2 | 10.2 | 35 | 1420 | 31 | 82.5 | 84.0 | 67.4 | 76.5 | 61.0 | 70.2 | 72.4 | 11.9 | 4 | 4 |

What is claimed is:

1. A method for the preparation of an aqueous slurry of calcium carbonate particles which comprises the steps of:
 (a) subjecting an aqueous slurry or a dehydrated wet cake of precipitated calcium carbonate particles containing an admixture of a viscosity-reducing agent having a solid concentration in the range from 25 to 75% by weight to a primary dispersing treatment by using a mixer so that the calcium carbonate particles have a median diameter in the range from 0.2 to 3.0 Jim and the slurry has a viscosity not exceeding 1000 centipoise at 25° C.;
 (b) admixing the aqueous slurry of (a) with dry-ground calcium carbonate particles having a median diameter in the range from 1.5 to 30.0 $\mu$m in such an amount that the weight proportion of the precipitated calcium carbonate to the ground calcium carbonate is in the range from 20:80 to 80:20 and the solid concentration of the resulting aqueous slurry is in the range from 60 to 85% by weight;
 (c) subjecting the aqueous slurry of (b) to a secondary dispersing treatment by using a mixer so that the slurry has a viscosity not exceeding 1000 centipoise at 25° C.; and
 (d) subjecting the aqueous slurry of (c) to a tertiary dispersing treatment in a sand grinding mill so that the median diameter of the calcium carbonate particles is in the range from 0.2 to 2.0 $\mu$m.

2. The method for the preparation of an aqueous slurry of calcium carbonate particles as claimed in claim 1 in which the primary dispersing treatment and the secondary dispersing treatment of the aqueous slurry are conducted in the same vessel.

3. The method for the preparation of an aqueous slurry of calcium carbonate particles as claimed in claim 1 in which the secondary dispersing treatment of the aqueous slurry of calcium carbonate particles is performed to such so that the calcium carbonate particles have a specific surface area in the range from 3 to 15 $m^2/g$.

4. The method for the preparation of an aqueous slurry of calcium carbonate particles as claimed in claim 1 in which the tertiary dispersing treatment of the aqueous slurry of calcium carbonate particles is performed to so that the calcium carbonate particles have a specific surface area in the range from 5 to 25 $m^2/g$.

\* \* \* \* \*

UNITED STATES PATENT AND TRADEMARK OFFICE
CERTIFICATE OF CORRECTION

PATENT NO. : 5,879,442
DATED : March 9, 1999
INVENTOR(S) : Hiroyuki NISHIGUCHI et al.

It is certified that error appears in the above-identified patent and that said Letters Patent is hereby corrected as shown below:

Column 15:

Claim 1, line 6, after "agent" insert --and--; and
      line 10, change "Jim" to --$\mu$m--.

Column 16:
Claim 3, line 14, delete "to such".

Claim 4, line 20, delete "to".

Signed and Sealed this

Tenth Day of August, 1999

Q. TODD DICKINSON

Attest:

Attesting Officer     Acting Commissioner of Patents and Trademarks